US006835900B2

(12) United States Patent
Jones (10) Patent No.: US 6,835,900 B2
(45) Date of Patent: Dec. 28, 2004

(54) AUTOMATED WEIGHT MEASUREMENT SYSTEM (76) Inventor: Clyde Jones, Rte. 1, Box 174, Broadhead, KY (US) 40409

( * ) Notice: Subject to any disclaimer, the term of this patent is extended or adjusted under 35 U.S.C. 154(b) by 191 days.

(21) Appl. No.: 10/338,330

(22) Filed: Jan. 8, 2003

(65) Prior Publication Data
US 2003/0141117 A1 Jul. 31, 2003

Related U.S. Application Data
(60) Provisional application No. 60/346,579, filed on Jan. 8, 2002.

(51) Int. Cl.$^7$ .............................................. G01G 19/00
(52) U.S. Cl. ...................................... 177/145; 177/146
(58) Field of Search .................................. 177/145, 146

(56) References Cited

U.S. PATENT DOCUMENTS

| 4,137,977 A | * | 2/1979 | Alger .......................... 177/146 |
| 4,491,190 A | | 1/1985 | Mayfield ..................... 177/139 |
| 4,533,008 A | | 8/1985 | Ostermann .................. 177/132 |
| 4,638,876 A | | 1/1987 | Balduin et al. ............. 177/139 |
| 5,666,295 A | | 9/1997 | Bruns ......................... 702/174 |
| 5,734,128 A | | 3/1998 | Gades et al. ................ 177/244 |
| 5,986,560 A | | 11/1999 | Rayburn ..................... 177/136 |

* cited by examiner

Primary Examiner—Randy W. Gibson
(74) Attorney, Agent, or Firm—Waters Law Office, PLLC; Robert R. Waters (57) ABSTRACT The present invention is a method and apparatus which automates the weight measurement of a payload in conjunction with a roller bed based loading/unloading station. The apparatus is designed as a retrofit for an existing loading station and consists a stationary frame mounted underneath the roller bed loading station. The apparatus includes lifters which are raised by air cylinders or the equivalent upon activation to physically remove the payload temporarily from the roller bar station while the weight is measured through load cells arranged with the lifters. The engagement and release of the lifters as well as the reading of information from the load cells is coordinated and controlled by a microprocessor. Appropriate communication means are provided for, to enable the system to be activated, and to allow the weight readings taken to be incorporated into other payload management functions such as billing, receiving, inventory control, or other functions. The system is further characterized by visual or audible alarms to prevent the system from being overloaded and to signal to an operator when it is safe to remove the payload or place an additional payload on the roller bed.

23 Claims, 10 Drawing Sheets

AUTOMATED WEIGHT MEASUREMENT SYSTEM

CROSS REFERENCE TO RELATED APPLICATIONS

This application claims priority from U.S. Provisional Application No. 60/346,579 filed on Jan. 8, 2002. This application relates to an automated weight measurement system to be used in facilitating a rapid and accurate weight measurement calculation for a production payload. The entire disclosure contained in U.S. Provisional Application No. 60/346,579, including the attachments thereto, is incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates generally to a weight measurement system for measuring the receiving weight of a payload. The weight measurement system is used in conjunction with a conveyor system and constructed such as to enable containers to be removed from a truck via a forklift and placed upon the conveyor-based scale system such that time and operating steps are saved in the weighing cycle in order to facilitate a faster unloading operation. The invention also has particular utility in a weight measurement system for livestock including poultry wherein the payload is processed quickly upon receipt at the processing center, and an accurate and fast measurement system is desirable.

In many production facilities, the weight of a raw material or production input is a critical factor that must be closely monitored. For example, in a production process characterized by one primary raw product input used in high volumes, the weight of the raw material is perhaps the most closely monitored production variable. In addition to production control, the price or value of the raw material is often a function of weight. Accordingly, accurate payment for said raw material requires accuracy in weight measurement.

In situations in which a raw material is transported to a production facility by trucks, quite often the delivery trucks are unloaded by means of a forklift or other hydraulic lift devices. In the typical scenario, a pallet or skid, usually constructed of wood or heavy polymer material, is used to support the container(s) of material from the interior bed of the truck. Pallets are arranged such that the tines of a forklift will easily engage the pallet for lifting, removal and placement at the production center. Quite often, the first function performed when a pallet of material is removed from a truck is the weighing of such pallets in order to verify or otherwise identify proper weight, and hence, payment. Accordingly, each pallet of material is placed onto a scale system of some sort. The weighing of individual pallets, however, can often be time consuming resulting in increased transportation costs for a given load. Accordingly, any weight measurement system that facilitates a fast and easy weighing of a load is highly advantageous.

In addition to speed and cost considerations, in scenarios in which the raw product in question is livestock or live animals such as poultry, a fast and effective weight measurement system is even more important. Poultry is typically shipped in large steel cage containers constructed to accommodate loading and unloading by forklift. In a poultry production facility, it is important to weigh a received load of chickens as soon as possible after the load is removed from the delivery truck. In the event that a delay occurs, the chickens may dry out or otherwise be affected by environmental conditions such as to diminish desirability of the chickens. In addition, delays in processing time for the chickens also results in an increased potential for disease transmission and death losses to the load before they can be processed. Accordingly, it is even more desirable to weigh the load immediately after it is removed from the delivery truck.

DESCRIPTION OF THE RELATED ART

A wide assortment of prior art attempts have been made to address the problem of providing a fast and effective means of accelerating the weighing function for a raw material load. Such prior art devices include static batch weight systems as well as dynamic systems and even forklift-mounted scale systems. Many of these devices are directed specifically to address the problems described above, but unfortunately, many of these devices introduce additional complications or drawbacks of their own.

U.S. Pat. No. 4,533,008 to Ostermann discloses a livestock scale system that generally resembles a combination of a utility wagon and a standard weight-slide mechanical scale system. The weight measurement system includes primary and secondary scale arms that are pivotally connected to a weight support apparatus. The system is mobile and can optimally be used to measure, for example, a litter of pigs or other livestock.

U.S. Pat. No. 5,666,295 to Bruns discloses a dynamic weight measurement system for operation with a hydraulic lift mechanism such as a forklift. Bruns notes and describes various other hydraulic lift weighing devices and boasts that his invention is less susceptible to accuracy degradation as a result of mechanical disturbances such as vibration or shifting of the load. Bruns operates by taking a plurality of pressure measurement readings during the time the load is supported by the hydraulic lift. The measurements are stored in a memory device and a microprocessor fine tunes the weight measurement while filtering unwanted signals associated with vibration or other mechanical disturbances. The Bruns mechanism essentially reads weight only during the portion of the lift in which acceleration of the forklift tines has ceased such that the pressure measurements are not affected by that factor. The device is otherwise a conventional fork truck with a cylinder housing a piston attached to the mast. A pressure transducer regulates hydraulic pressure and creates electrical signals corresponding to the weight resistance. The electrical signals are transmitted to processing circuitry which includes a microprocessor and a first and second memory element. While novel in many respects, the Bruns method is more complicated than would otherwise be necessary, as a result of the inherent difficulty associated with a scale system which is mobile with respect to the Earth.

Another forklift-based weight measurement system is disclosed in U.S. Pat. No. 5,986,560 by Rayburn. The Rayburn device includes one or more weight sensing means embedded in the tines of a forklift such as to measure the weight of an object resting upon the forklift. The weight system means is in communication with a display means preferably mounted on the dashboard, to be read by the operator. The invention further discloses a novel wiring assembly for use with such modified forklift blades. In addition to providing weight measurement, the Rayburn system enables an operator to know immediately whether or not the weight limitations of the forklift are being exceeded. However, the Rayburn device does not provide automatic feedback of the measured quantities to a production system wherein such information may be needed.

U.S. Pat. No. 4,491,190 to Mayfield discloses a weight measurement apparatus designed to be affixed to vehicles for lifting, transporting, loading, and simultaneously weighing an object. Specifically, the Mayfield device is designed to be attached to a farm implement such as a tractor in order to weigh and transport material, and is especially directed to weighing and transporting round hay bales. The device is similar in appearance to a pair of forklift tines and the frame members are closely linked by a parallelogram linkage system in a manner allowing some relative parallel-planar longitudinal movement while restricting relative lateral movement.

U.S. Pat. No. 4,638,876 by Balduin et al. is a weight measurement system designed to be effective on eccentric loads or objects which are irregular in weight distribution. The device consists essentially of a weighing plate mounted upon three essentially triangularly arranged weight cells which communicate with a computing device for weight measurement. The Balduin device may be mounted on a forklift while still allowing flexibility in the arrangement of the load with respect to the weight cells and the forklift tines. However, the Balduin device has little application to a conveyor arrangement and would not perform optimally in situations where the load is moving.

BRIEF DESCRIPTION OF DRAWINGS

Additional utility and features of this invention will become more fully apparent to those skilled in the art by reference to the following drawings, wherein all components are designated by like numerals and described more specifically.

SUMMARY OF THE INVENTION

In view of the forgoing disadvantages inherent in the preexisting methods and devices for performing payload weight measurements, the present invention provides a significant improvement. As such, the general purpose of the present invention, which will be described subsequently in greater detail, is to provide a new and improved automated weight measurement system for improved speed in payload processing and management.

In order to achieve this general objective, the present invention consists essentially of a weight scale system to be positioned underneath a preexisting roller conveyor-type payload processing station such as to introduce the invention into a plant setting with minimal invasion and construction cost. The invention includes a frame preferably made of steel upon which the weight measurement equipment is mounted. A microprocessor controls the operation of a set of air cylinders or the equivalent which are used to lift and engage the payload to be measured, elevating it from the pre-existing plant conveyor system. The lifters communicate with a set of load cells appropriately sized for the expected payloads. The system further includes payload sensors for detecting the appearance of a payload and the appropriate communication feedback capabilities such that the detection of a load is communicated to the microprocessor. The system is further characterized by appropriate visual and/or audible alarms for signaling to personnel such as forklift operators the status of the weight measurement operation and equipment. Sensing capabilities such as visual indicators, bar code sensors or the like are used to detect payload information such that weight measurements can be properly coordinated by the microprocessor accurately for an effective payload management system.

It is a primary objective of the present invention to provide for an effective in-line measurement system for determining the weight of a payload which is versatile for utility in a wide assortment of production facilities.

It is a further objective of the present invention to provide an automated weight measurement system that minimizes the handling of the payload, and particularly minimizes the human handling of such payloads.

It is a further objective of the present invention to provide an automated weight measurement system that is easy to construct and easy to retrofit into a wide assortment of existing plants and loading/unloading facilities.

It is a further objective of the present invention to provide for an accurate and expedited measurement of payload weight to enhance the speed of the loading/unloading operations.

It is a further objective of the present invention to provide an automated weight measurement system that is easy to operate for personnel with minimal training and which may be used by personnel that have only casual interaction with the production facility such as delivery personnel, truck drivers, or temporary laborers.

A further objective of the present invention is to incorporate safety features that effectively aid in preventing injury to personnel or damage to payloads while providing an effective in-line measurement for weight.

It is a further objective of the present invention to provide for the automation of weight measurement and the coordination of the weight measurement operation with other payload management functions such as inventory control, record keeping and billing/invoicing.

It is a further objective of the present invention to automate and expedite the coordination between the unloading operation and the weighing operation for particular utility with payloads that are subject to dehydration damages in the event of a delay between unloading and weighing. Such a system has particular utility with payloads such as livestock or other live animals.

There has thus been outlined in a broad sense, the more important features of the present invention in order that the detailed description thereof that follows may be better understood, and in order that the present contribution to the art may be better appreciated. There are, of course, additional features of the invention that will be described hereafter and which will form the subject matter of the claims appended hereto.

In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may be readily utilized as a basis for the designing of other structures, methods and systems for carrying out the purposes of the present invention. It is important, therefore, that the claims be regarded as including such equivalent constructions in so far as they do not depart from the spirit and scope of the present invention.

Furthermore, the purpose of the forgoing abstract is to enable the U.S. Patent and Trademark office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DETAILED DESCRIPTION OF THE PREFERRED EMBODIMENT

The weight measurement system of the present invention can be used in a variety of industries and production facilities. The invention has particular utility in the chicken processing industry where live birds are trucked to a plant in large cages and need to be quickly weighed and processed. The detailed description below is for a preferred embodiment of the invention in which the weight measurement system is used in a chicken processing conveyor-based system. It is to be understood that a variety of other arrangements are also possible without departing from the spirit and scope of the invention. Accordingly, the description of the preferred embodiment below is not meant to be limiting as to the scope of the invention.

In a conventional chicken processing plant, a roller bed assembly system is used to move cages of live birds from a loading dock to the production center. Accordingly, the payload cages are constructed to accommodate movement by forklift, and generally include the appropriate openings in the bottom foundation of the cage for placement of forklift tines. The payload cages are moved via a forklift to a roller bed assembly as shown in FIG. 1.

Figure 1:
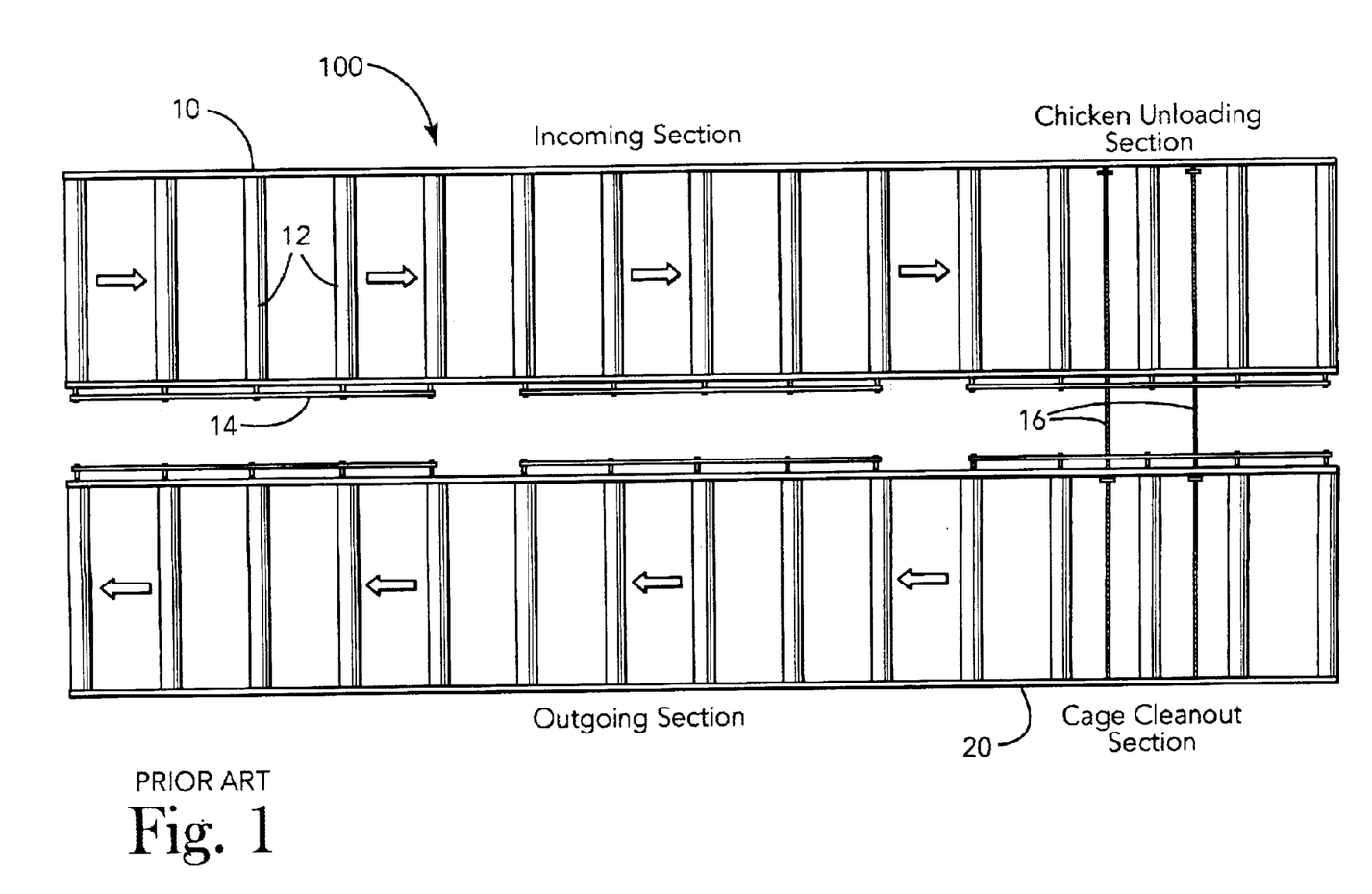
FIG. 1 is a plan view of a typical roller bed assembly unloading station as used, for example, in unloading cages of live chickens. The roller bed system includes an incoming section, a chain crossover, and an outgoing section.

As shown in FIG. 1, a standard unloading station in a receiving bay of a processing plant will generally include a conveying system 100 comprising a series of evenly spaced roller elements 12 which are motorized in unison by a belt or chain 14 located on one end of the incoming roller bed section 10, and generally powered by hydraulics. An operator normally controls the operation state of the incoming rollers on the roller bed. The roller elements 12 may be caused to move forward or in reverse. Generally speaking, the payload will travel forward on the mechanized roller elements until an unloading station is found at the end of the first roller bed assembly. The cage is then opened and the cage is mechanically moved forward such as to place the payload (chickens) into a receiving bin. After the payload has been removed, a pair of horizontal crossover chains 16 are used to remove the cage assembly from the incoming roller bed section 10 to an outgoing roller bed section 20 disposed immediately adjacent the incoming roller bed section 10. In general, the system may employ a cage clean out section immediately upon removal of the cage from the incoming roller bed section 10 to the outgoing roller bed section 20. After the cage has been appropriately cleaned or maintained, an operator causes the cage to move down the outgoing roller bed section 20 to the end where the cage can be reloaded upon a truck or otherwise stored.

Figure 2:
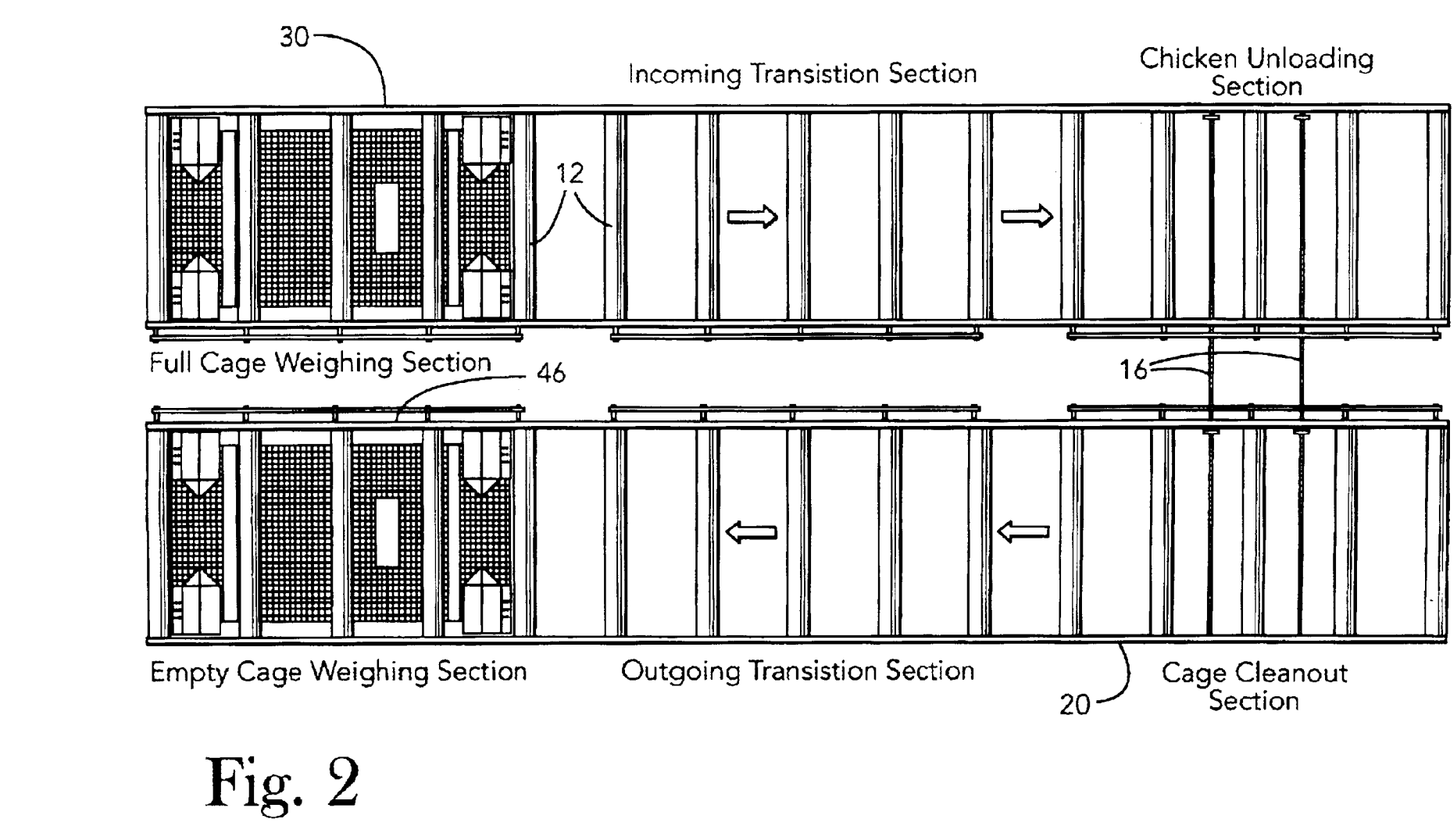
FIG. 2 is a plan view of a typical roller bed assembly modified to include the present invention.

FIG. 2 shows a chicken unloading station modified by the inclusion of the weight measurement system of the present invention. As shown, a weighing station 30 has been installed at the incoming roller bed section 10 and a complementary weighing station 46 has been installed on the last section of the outgoing roller bed section 20. The operation of the incoming and outgoing roller bed sections are still managed by an operator; however, in keeping with safety desires, control limitations have been installed such as to prevent accidental engagement. Accordingly, the first section of the incoming roller elements 12 will not respond to the operator's controls unless the previous cage has been weighed and recorded. This safety feature will prevent an operator from pushing cages through in such a way as to overpower the system.

Figure 3:
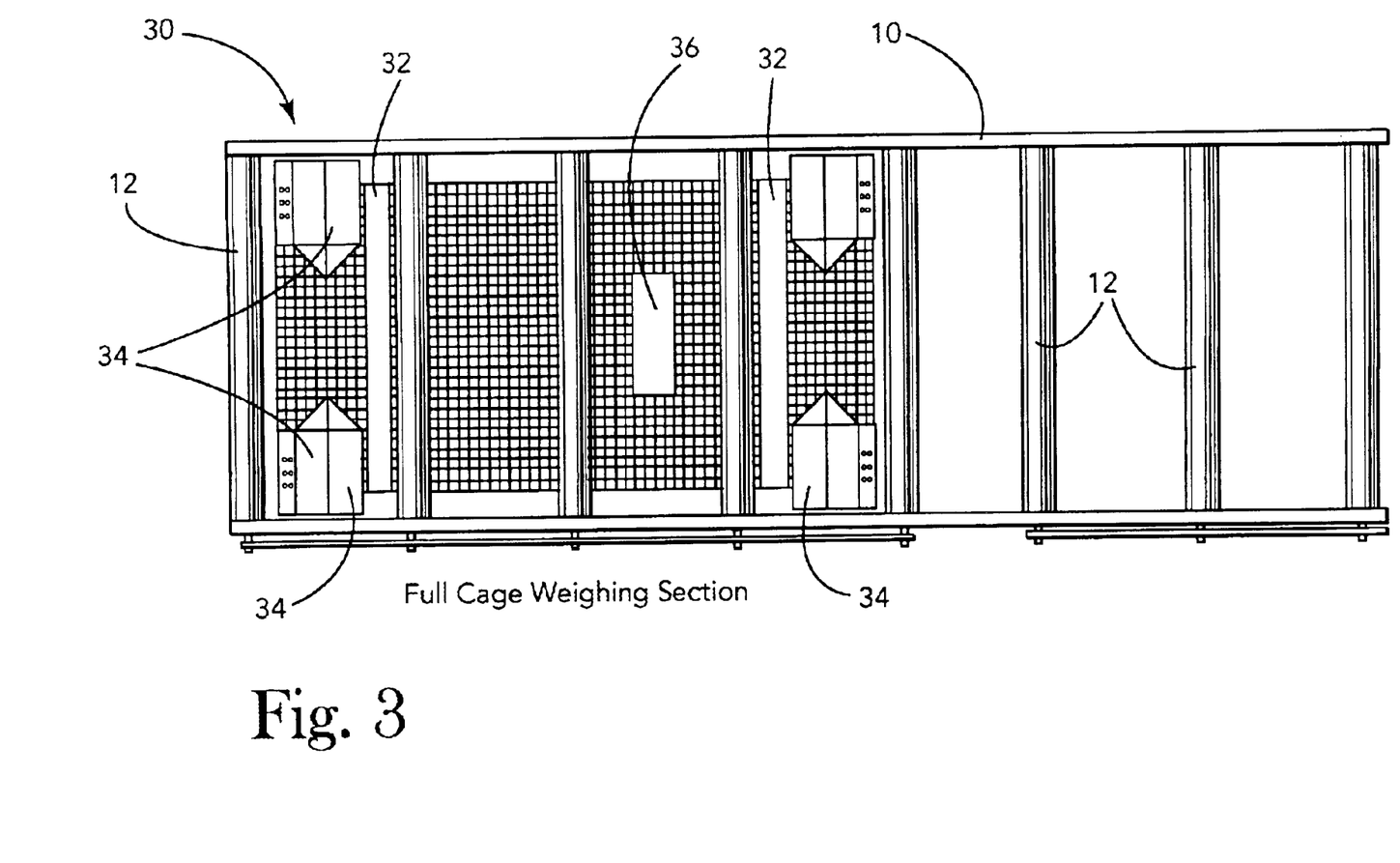
FIG. 3 is a close-up plan view of the present invention showing the weighing station and payload sensors.

FIG. 3 shows a close up top view of the weight measurement system 100 of the present invention. As shown, the weighing station 30 is located underneath the standard roller bed section 10, and is designed such as to provide only minimal interference with the operation of the roller bed. In keeping with one of the primary objectives of the present invention, it is desirable that the present invention be adapted for use on standard, pre-existing roller bed systems in order to achieve greater utility. As further shown, the system includes a set of payload lifters 32 which are used to physically remove the cage from the conveyor for achieving the weighing exercise. These payload lifters 32 are generally constructed of steel, preferably stainless steel, and are lowered to an elevation at least two inches below the top plane surface of the roller bed rollers 12 when the system is not in use. Upon activation, the payload lifters 32 are caused to raise to an appropriate height such that the payload is removed from the roller bed/conveyor system 10. The lifters may be sized and constructed to couple directly with the payload (cages). As an alternative, a steel bar may be used to anchor the tops of two lifters together such that the bar is oriented between two rollers. As the lifters raise, the bar is raised which catches and lifts the payload.

As further shown in FIG. 3, the system may include sensors 34 located at the four corners of the approximate location of the payload cage which may be used to detect when a payload is properly positioned such that lifting may begin. FIG. 3 also shows an RFID antenna 36 which is used to detect and identify cages. This, of course, will be important in properly associating a weight measurement with the appropriate payload which was measured.

Figure 4:
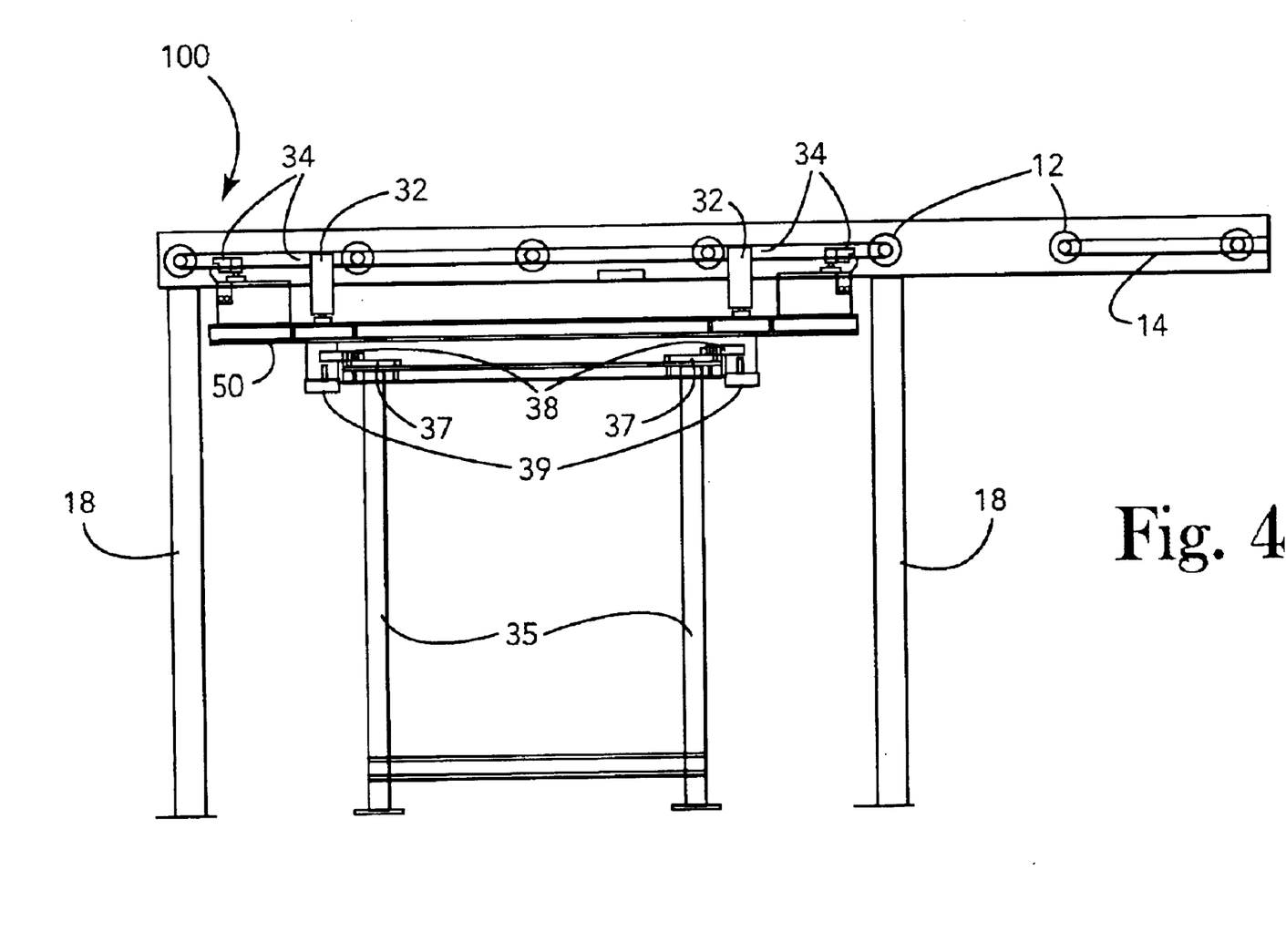
FIG. 4 is an elevation view showing the support frame for the weight measurement deck and payload lifters of the present invention.

FIG. 4 shows an elevation view of the weight measurement system 100 of the present invention. As shown, the measuring components are supported by a weight measurement frame 35 mounted in the interior of the roller bed frame 18. The weight measurement frame 35 is optimally constructed of steel and FIG. 4 shows a rectangular support frame constructed of two steel vertical I-beam members and two horizontal I-beam members, although other support frames are certainly possible. This support frame includes four steel brackets 37 that hold load cells 38 with four air (or hydraulic) cylinders 39 oriented upon said load cells 38 as shown in the drawing. Mounted on the tops of the air cylinders 39 is a steel weight deck 50 which includes four cylindrical cage lifters 32 oriented at the corners. It is the purpose of the present invention that the system will serve to raise the weight deck 50 upon filling of the air cylinders 39. FIG. 4 also shows a better view of the corner sensors 34 on the primary roller bed frame 18. The corner sensors 34 are constructed of a somewhat flexible metal and exhibit a triangular profile. When a cage is placed on the corner sensors 34, the sensors are depressed which sends a signal to activate the system.

Figure 5:
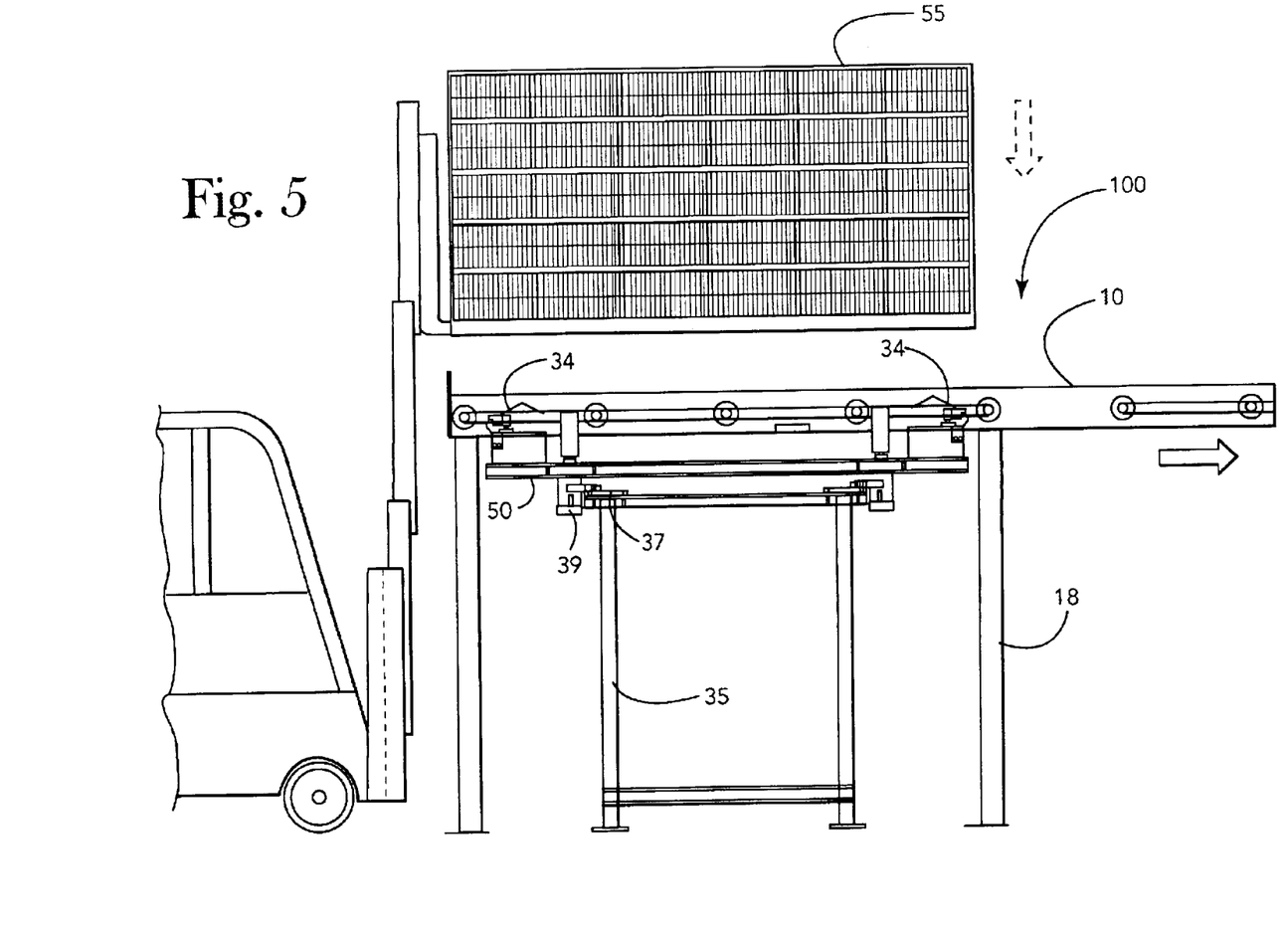
FIG. 5 is an elevation view showing the placement of a payload upon a roller bed assembly and weight measurement station, shown at a point prior to placement of the payload upon the roller bed.

FIG. 5 shows an elevation view of the loading of a payload 55 onto the weight measurement system 100 in a typical use. As shown, the payload 55 is not yet placed onto the roller bed 10, and accordingly, all four corner sensors 34 are undepressed. No cage is detected. The system includes a number of colored lights which are oriented such as to be within the view of the forklift operator. (Not shown in the drawings.) The colored lights are meant to indicate when the system is ready for a payload 55 to be weighed or other action to be taken by the operator. In this preferred embodiment, a green light is meant to indicate that the weighing section is ready for a payload 55 to be placed upon the scale. In FIG. 5, since no payload 55 is resting upon the scale, the operator would be viewing a green light as the cage is descended.

Figure 6:
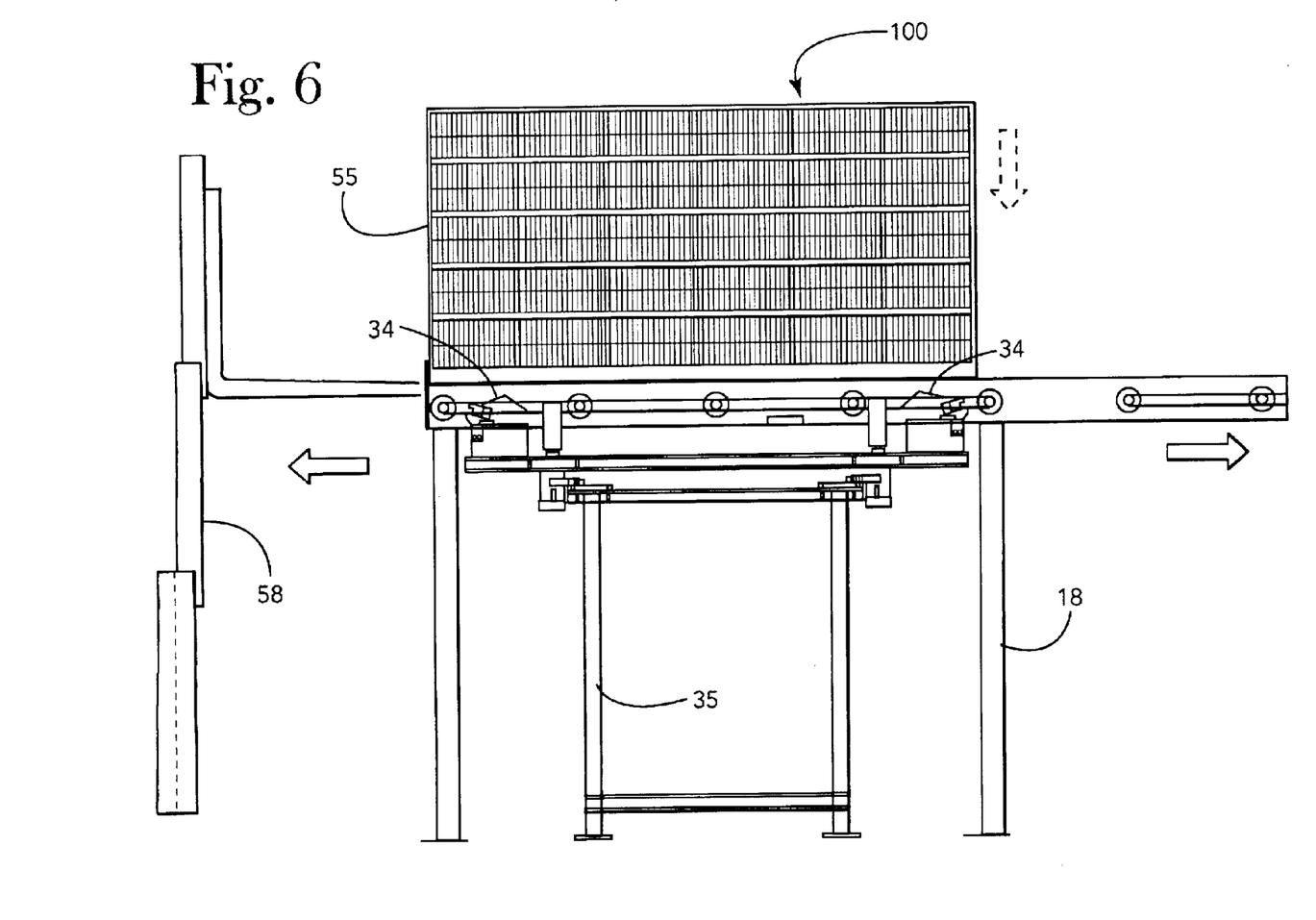
FIG. 6 is an elevation view showing the placement of a payload upon the roller bed assembly and weight measurement station of the present invention, shown immediately after placement of the payload.

FIG. 6 shows the weight measurement system 100 of the present invention wherein a forklift operator has just placed a payload 55 upon the scales. As shown in the drawing, the forklift 58 is backing away from the system, removing the forklift tines from the underside of the payload 55 and removing the forklift 58 from the immediate area of the roller bed frame 18 and weight measurement frame 35. As shown, all four corner sensors 35 are depressed by the weight of the payload 55. Accordingly, the depression of said corner sensors 34 causes the green light to go off and a yellow light comes on. This signals the forklift operator that a delay timer has been started, giving the forklift operator time to back away from the frame. The yellow light remains activated until the delay timer has expired. The delay timer can be set for an appropriate amount of time, and could be altered by the operator with the appropriate overrides.

Figure 7:
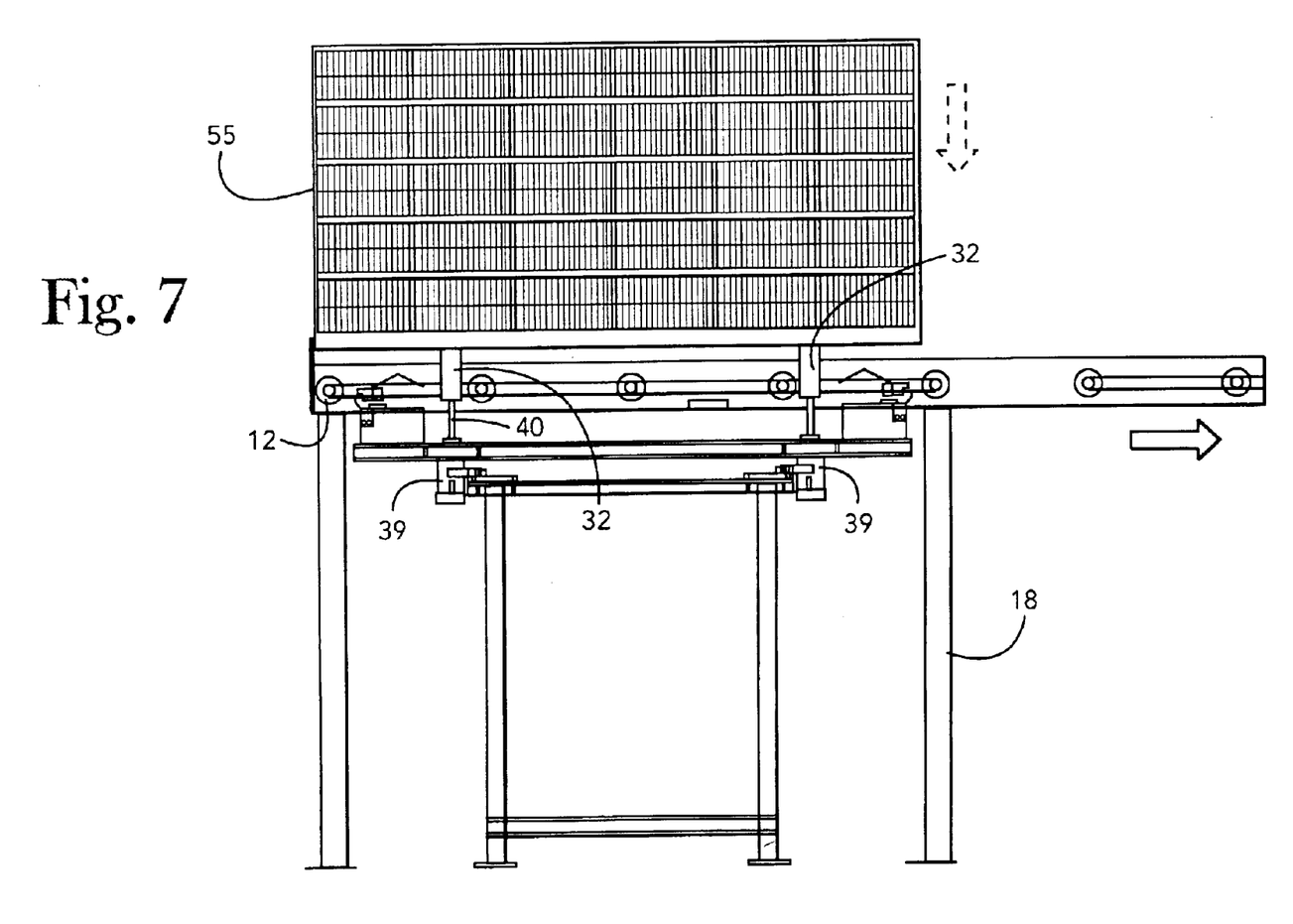
FIG. 7 is an elevation view showing a payload being weighed by the present invention, including full engagement of the cage lifters.
Figure 8:
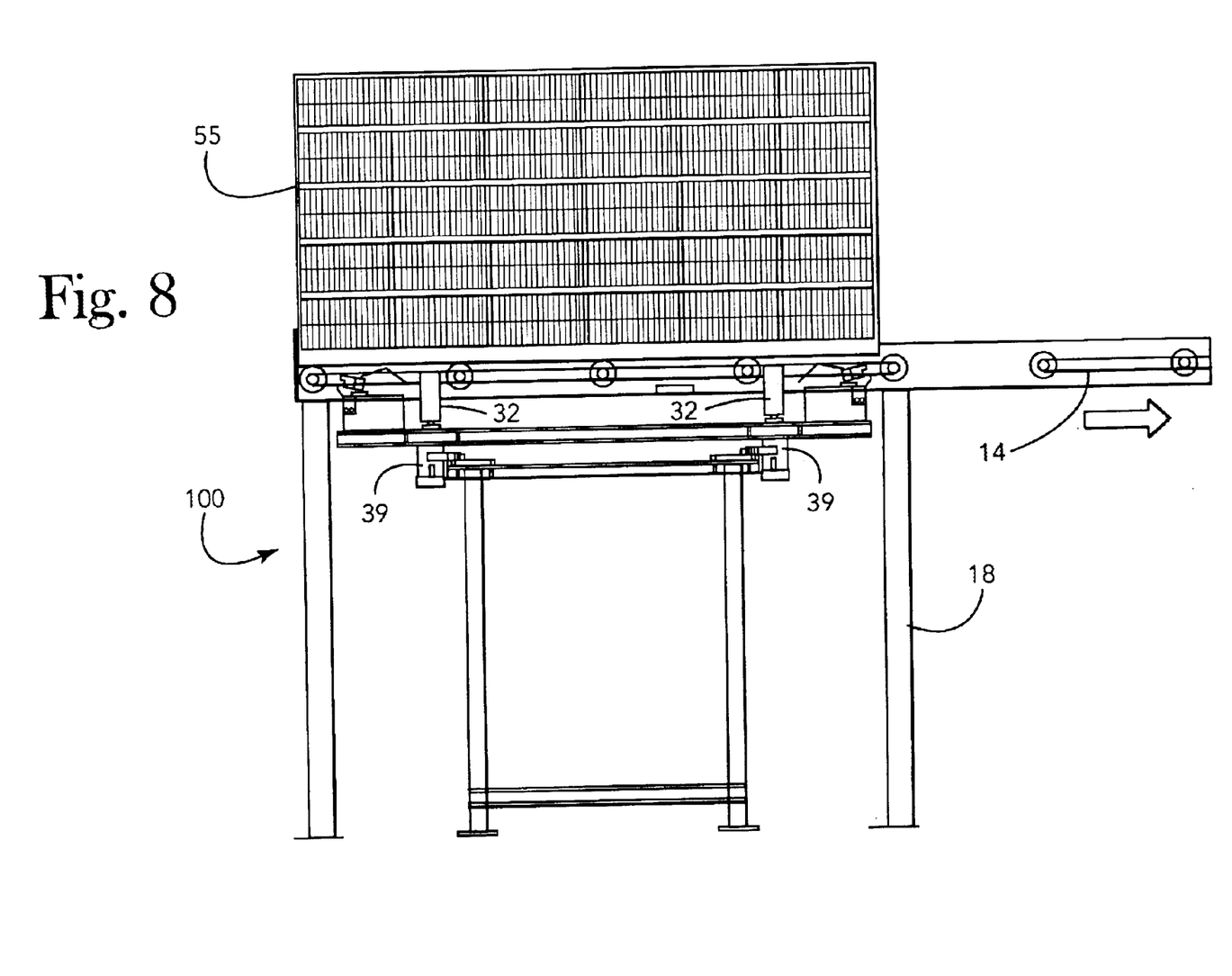
FIG. 8 is an elevation view showing a payload being measured by the weight measurement system of the present invention shown at a point in which the payload lifters have been retracted.

FIG. 7 shows the present invention wherein the cage lifters 32 have been activated thus lifting the payload 55 from the roller bed frame 18. At the point in which the lifters 32 begin rising, the yellow light will extinguish and a red light will display indicating to the operator that the lifters 32 are being engaged. The actual lifting of the payload 55 is achieved by the filling of the air cylinders 39 which causes the vertical rise of the lifter support bars 40 and, accordingly, the weight frame (payload 55) itself. In contrast, FIG. 8 shows the weight measurement system 100 wherein the payload lifters 32 have been retracted. Retraction of the lifters 32 will occur after an appropriate weight measurement has been taken. At this point, the red light extinguishes and a blue light is activated. This tells the operator that the weighing cycle has been completed and the operator may now activate the roller bed section 10 to remove the payload 55 from the immediate area. In order to insure safety for both personnel and equipment, the system includes appropriate controls which prevent any operation of the roller bed chains 14 unless the blue light is activated.

Figure 9:
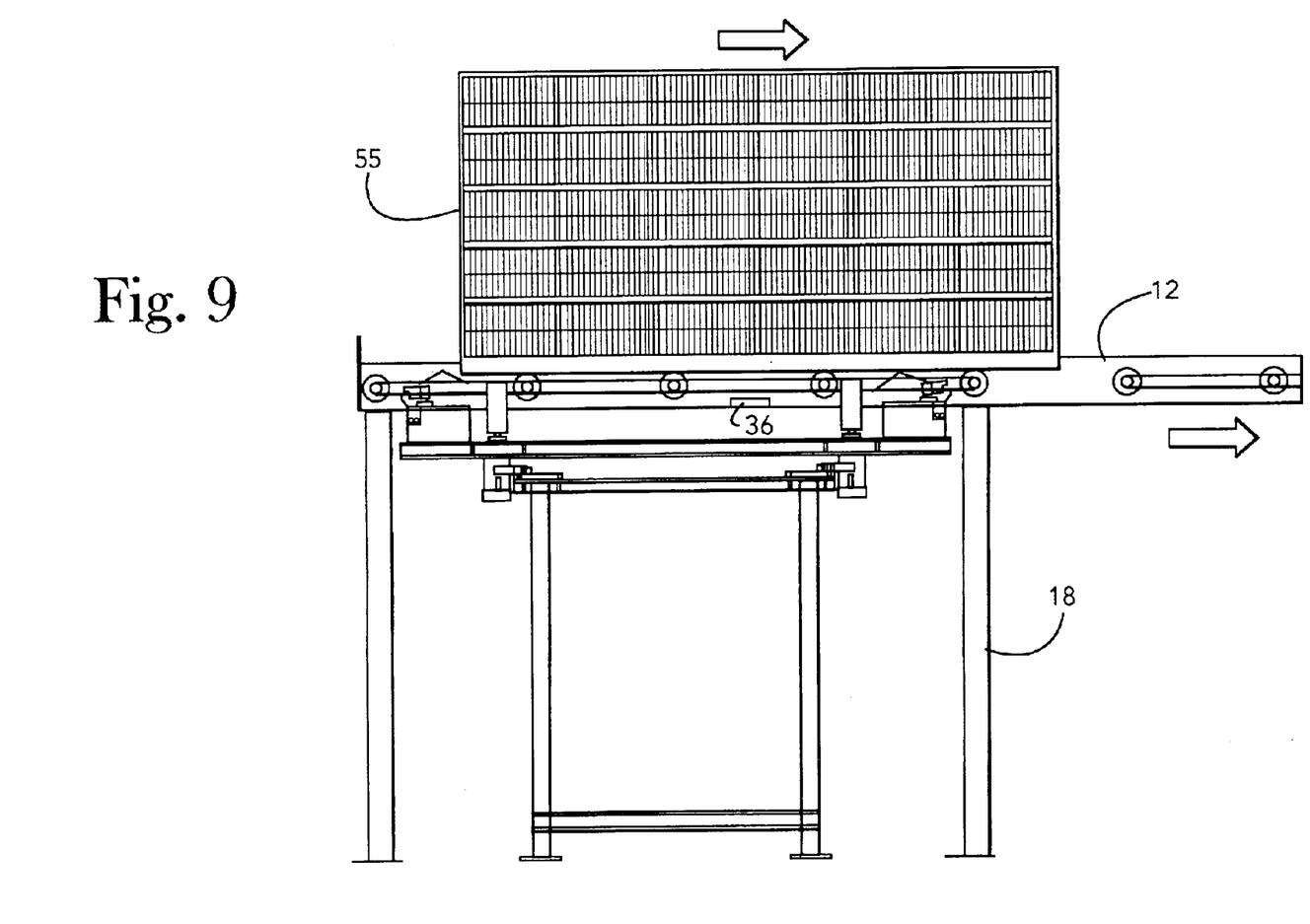
FIG. 9 is an elevation view showing a payload being transported by the roller bed assembly such as to be removed from the weight measurement station.

FIG. 9 shows the present invention wherein a payload 55 has begun traveling to the right leaving the weighing station 30. As shown, the two leftmost corner sensors 34 are now undepressed. The blue travel light will remain activated until the payload 55 has completely left the weighing station 30 such that all four corner sensors 34 are undepressed. FIG. 9 also shows the location of an RFID antenna 36 which is used to read a label, such as a magnetic tag or barcode, attached to the bottom of the payload 55. This is used for identification purposes to associate the appropriate payload 55 with the appropriate weight measurement.

Figure 10:
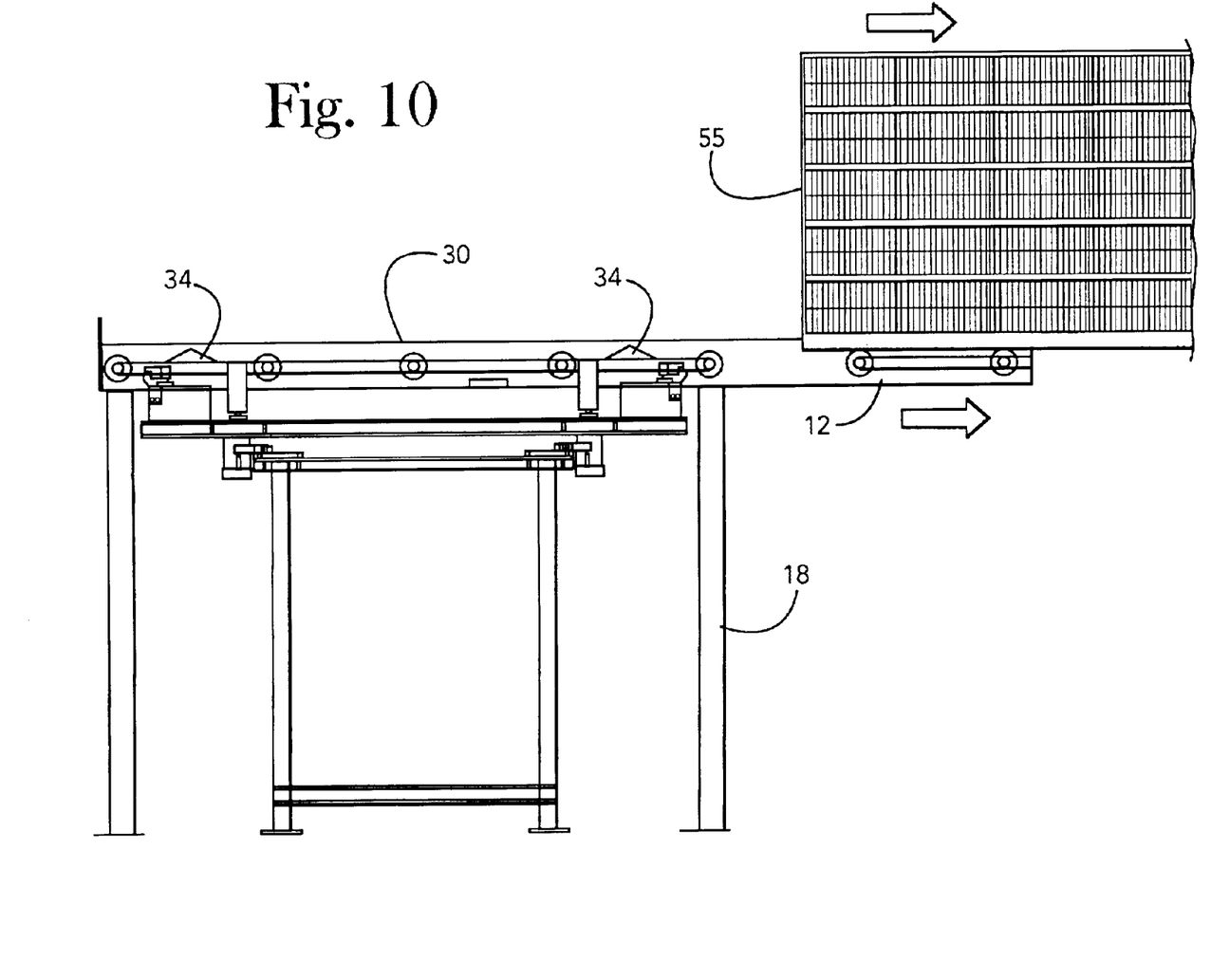
FIG. 10 is an elevation view showing the roller bed assembly and weight measurement station immediately after the payload has been transported from the station.

FIG. 10 shows the system wherein the payload 55 has completely left the weighing station 30 such that all four corner sensors 34 are undepressed. Upon the removal of the payload 55, a second timing cycle is begun such as to give the system a little more time for the payload 55 to completely exit the immediate area. After the second timing cycle is completed, the weighing station 30 is now ready for another payload 55 to be placed upon the scale and the green light is again activated to let the forklift operator know that the system is ready.

The timing circuit, control circuitry for the lights, corner sensors and weight measurement equipment are all controlled and recorded by a microcomputer or the like. The control circuitry and microcomputer are located remotely such as not to be affected by harsh environmental conditions or physical interference. The microcomputer and other circuitry are not shown in the drawings.

I claim:

1. An apparatus for measuring the weight of a payload being transported on a motorized conveyor system comprising:
    a) a free-standing frame oriented underneath said motorized conveyor system;
    b) one or more vertical lifters mounted upon said frame and oriented such that said lifters may be engaged to raise through said conveyor system to engage and lift a payload from said conveyor system;
    c) one or more load cells mounted upon said frame and in communication with said lifters such as to identify a weight measurement of said payload upon engagement and lifting of said payload by said one or more lifters;
    d) a microprocessor in communication with said one or more load cells, said microprocessor serving to monitor and record said weight measurements taken by said load cells, and said microprocessor further serving to monitor and control the operation of said motorized conveyor system; and
    e) means for interrupting the operation of said motorized conveyor system by said microprocessor when said one or more lifters are raised.

2. The apparatus of claim 1 wherein said frame is constructed of steel and consists of a horizontal platform supported by a series of permanently anchored vertical legs.

3. The apparatus of claim 1 wherein said apparatus is constructed as a retro-fit apparatus to be modified to operate with a pre-existing motorized conveyor system.

4. The apparatus of claim 1 wherein said apparatus is further comprised of one or more sensors located near or upon said motorized conveyor system and arranged to determine when a payload is present upon said motorized conveyor system and available to be weighed.

5. The apparatus of claim 4 wherein said sensors are spring-loaded mechanical depression switches mounted upon said conveyor system such that they are compressed and activated upon the physical movement of a payload into position above said weight measurement frame.

6. The apparatus of claim 4 wherein said sensors are optical eyes, motion sensors, microswitches or proximity switches mounted such as to detect the movement of a payload into position above said weight measurement frame.

7. The apparatus of claim 1 wherein said lifters are hydraulically powered.

8. The apparatus of claim 1 wherein said lifters are air cylinders.

9. The apparatus of claim 1 wherein said apparatus is further comprised of a means for reading an identification tag or marker located on said payload, for association of a specific weight measurement with a specific payload by said microprocessor.

10. The apparatus of claim 9 wherein said apparatus is further comprised of software operated by said microprocessor to associate the weight measurement information for a specific payload to business functions affected by said weight measurement data such as billing, accounting and inventory control.

11. The apparatus of claim 1 wherein said apparatus is further comprised of a means for communicating to a system operator whether said lifters are engaged and whether said conveyor system is free from a weight measurement operation taking place such that a different payload may be loaded and the conveyor system operated.

12. The apparatus of claim 11 wherein said means for communicating to a system operator is comprised of visual indicators, lights, audible alarms or a combination thereof.

13. A method of measuring the weight of a payload being transported on a motorized conveyor system comprising the steps of:
 a) placing a permanently mounted free-standing frame underneath said motorized conveyor system;
 b) mounting one or more vertical lifters upon said frame and oriented said one or more lifters such as to engage and raise through said conveyor system to lift a payload from said conveyor system;
 c) mounting one or more load cells upon said frame and in communication with said lifters such as to identify a weight measurement of said payload upon engagement and lifting of said payload by said one or more lifters;
 d) orientation of a microprocessor in communication with said one or more load cells, said microprocessor serving to monitor and record said weight measurements taken by said load cells, and said microprocessor further serving to monitor and control the operation of said motorized conveyor system; and
 e) interrupting the operation of said motorized conveyor system by said microprocessor when said one or more lifters are raised.

14. The method of claim 13 wherein said frame is constructed of steel and consists of a horizontal platform supported by a series of permanently anchored vertical legs.

15. The method of claim 13 wherein said method is further comprised of mounting one or more sensors near or upon said motorized conveyor system and arranging said sensors to determine when a payload is present upon motorized conveyor system and available to be weighed.

16. The method of claim 15 wherein said sensors are spring-loaded mechanical depression switches mounted upon said conveyor system such that they are compressed and activated upon the physical movement of a payload into position above said weight measurement frame.

17. The method of claim 15 wherein said sensors are optical eyes, motion sensors, microswitches or proximity switches mounted such as to detect the movement of a payload into position above said weight measurement frame.

18. The method of claim 13 wherein said lifters are hydraulically powered.

19. The method of claim 13 wherein said lifters are air cylinders.

20. The method of claim 13 further comprising the step of reading an identification tag or marker located on said payload, for association of a specific weight measurement with a specific payload by said microprocessor.

21. The method of claim 20 further comprising the step of utilizing software operated by said microprocessor to associate the weight measurement information for a specific payload to business functions affected by said weight measurement data such as billing, accounting and inventory control.

22. The method of claim 13 further comprising communicating to a system operator whether said lifters are engaged and whether said conveyor system is free from a weight measurement operation taking place such that a different payload may be loaded and the conveyor system operated.

23. The method of claim 22 wherein said communicating to a system operator is achieved through the use of visual indicators, lights, audible alarms or a combination thereof.

* * * * *